United States Patent
Dubrovskaya-Vinokurova et al.

(10) Patent No.: US 8,409,345 B1
(45) Date of Patent: Apr. 2, 2013

(54) GASEOUS CONCRETE RAW MIXTURE

(75) Inventors: Galina Dubrovskaya-Vinokurova, Munich (DE); Imia Ayaz Suleyman Ahmedov, Baker (AZ)

(73) Assignee: Malaxit, Baku (AZ)

( * ) Notice: Subject to any disclaimer, the term of this patent is extended or adjusted under 35 U.S.C. 154(b) by 0 days.

(21) Appl. No.: 13/373,532

(22) Filed: Nov. 18, 2011

(51) Int. Cl.
*C04B 7/13* (2006.01)
*C04B 18/06* (2006.01)

(52) U.S. Cl. .................. 106/709; 106/710; 106/711

(58) Field of Classification Search .......... 106/709, 106/711, 710
See application file for complete search history.

(56) References Cited

FOREIGN PATENT DOCUMENTS

| | | | |
|---|---|---|---|
| RU | 94023197 | | 10/1995 |
| SU | 481564 | | 10/1975 |
| SU | 649677 | | 2/1979 |
| SU | 649677 | * | 5/1979 |
| SU | 1070129 | | 1/1984 |

* cited by examiner

*Primary Examiner* — Anthony J Green
*(74) Attorney, Agent, or Firm* — Henry M Feiereisen, LLC

(57) ABSTRACT

A mixture for making gaseous concrete includes Portland cement, slaked lime, ash, aluminum gas forming material, dispersed reinforcing fiber, water, and as the gas forming material and the dispersed reinforcing fiber, it contains aluminated glass fiber, with the following ratio of components in mass %: Portland cement 30-34, Slaked lime 3-4, Ash 18-22, Aluminated glass fiber 1-5, water 37-42, Hemihydrate gypsum 0.4-0.5.

1 Claim, No Drawings

GASEOUS CONCRETE RAW MIXTURE

BACKGROUND OF THE INVENTION

The present invention relates to raw mixtures for producing gaseous concrete constructions having improved properties when compared with known solutions.

Various raw mixtures for producing gas-field dispersed-reinforced concretes are known having improved characteristics, in particular in regard to strength during stretching (during bending and straight stretching), while the best effect is provided when mixtures of reinforcing elements are selected in accordance with a size and a composition. However, they have problems related to adhesion to concrete of reinforcing elements, carrying out main loads and increasing the reliability of construction elements. This is special important for gas-filled construction mixtures (concretes).

Gas-forming metal, aluminum is used as a powder which easily oxidizes in presence of traces of moisture. Frequently aluminum gas-forming component which is used as a powder comminuted in a ball mill is oxidized by 20-30%, which reduces its practical gas-forming ability.

Gas forming aluminum is fire risky metal, which needs special conditions for its storage and use. It is also known that aluminum powder is often stolen for use in explosion material for terrorism.

SUMMARY OF THE INVENTION

Accordingly, it is an object of the present invention to provide gaseous concrete raw mixture, which eliminates the disadvantages of the prior art.

In keeping with these objects, one feature of the present invention resides in a gaseous concrete mixture which includes a binder selected from the group consisting of cement, gypsum, and both, slaked lime, aluminum gas forming material, dispersed reinforcing elements (glass fiber) and water, and in addition as a gas forming and reinforcing elements glass fiber is utilized which is coated with aluminum (aluminated glass fiber).

The novel features which are considered as characteristic for the present invention are set forth in particular in the appended claims.

DESCRIPTION OF THE PREFERRED EMBODIMENTS

In accordance with the present invention accordingly, a gaseous concrete mixture is provided which includes a binder selected from the group consisting of cement, gypsum, and both, slaked lime, aluminum gas forming material, dispersed reinforcing elements (glass fiber) and water, and as a gas forming and reinforcing elements glass fiber is utilized which is coated with aluminum (aluminated glass fiber).

The aluminum coating on the surface of glass fiber is formed in accordance with a known technology by moisturizing a glass thread during stretching of glass fiber during its manufacture, with a molten aluminum. This technology has been used over 30 years for producing aluminated glass fiber for radio electronic war and allows to produce an assortment of aluminated fibers with different properties with consideration of different use of concrete constructions.

The content of aluminum on the fiber is recommended to be selected in the range 5-25%.

The use of aluminated glass fiber has the advantage that it allows to achieve maximum allowable adhesion of dispersing-reinforcing glass fibers to the concrete, since freshly formed juvenile surface of glass fiber reacts with concrete after dissolving of aluminum.

The use of aluminated fibers excludes conventional difficulties associated with aluminum powder, complex gas forming material is mixed with a concrete mass easily and uniformly, does not generate dust, does not jeopardize breathing of workers, is fire and explosion safe (aluminated glass fiber cannot be fired even in the compositions of pyrotechnic mixtures).

The solid oxidized film formed on the melt of aluminum during forming of aluminated glass fiber efficiently prevents aluminum from corrosion, guarantees many years for effective storage. Only in the presence of such strong alkali as slate lime, aluminum is dissolved in water with formation of foam-forming gas hydrogen, and then the freshly formed surface of the glass fiber reacts chemically with the binder.

For controlling the quality of concrete mixture in accordance with the present invention, it is possible to use known additives-water soluble polymers, dispersers and/or emulsifiers. Raw mixtures for manufacturing cellular concrete are known which include Portland cement, thinly comminuted sand (stone-cool ash), gypsum, aluminum powder, nitrogen carbide, carboxymethyl cellulose (alkyl sulfate), water as disclosed in SU 481564 and SU 649677. The disadvantage of this mixture is its high volume density and reduced strength of cellular concrete.

Raw mixtures for producing cellular concrete is known, which includes Portland cement (20-30 weight %), gypsum (1-3 weight. %), aluminum powder (0.2-0.25 weight %), alkyl sulfate (0.2-0.3 weight %), stone-cool ash (25-35 weight %), lime (1.5-4 weight %), carboxymethyl cellulose (0.4-0.15 weight %), polymer acetate emulsion (2-8 weight %) and water for the purpose of reducing the volume mass and increasing the strength of concrete (SU 1070129).

The main disadvantage of this composition is increased costs of production due to additional milling of ash to specific surface 6000-8000 $cm^2/g$ and high expenditures of expensive material such as polyvinylacetate emulsion and carboxymethyl cellulose.

RU 94023197 discloses a raw mixture including acid ash of hydro removal (ash-removal) (50.5-50.9 mass %) with content of non-burnt fuel 16-20% and specific surface 3000-3500 $cm^2/g$, Portland cement (49 mass %), alkali component (0.1-0.5 mass %), aluminum powder over 100-0.1%. The disadvantage of this composition is low strength characteristics of the cellular concrete.

The improved raw material mixture for producing articles from gaseous concrete includes Portland cement, slaked lime, ash removed from electric power station, aluminum powder, water, hemihydrate gypsum, asbestos dust with the following ratio:

| | |
|---|---|
| Portland cement | 30-34 |
| slaked lime | 3-4 |
| ash | 18-22 |
| aluminum powder | 0.02-0.1 |
| water | 37-42 |
| hemihydrate gypsum | 0.4-0.5 |
| asbestos dust | 6-10. |

This composition is considered to be a prototype.

The following examples of use are presented for a better understanding of the invention.

EXAMPLE

For making gaseous concrete mixture, slaked lime, ash, 50% water (from total quantity of water of closure) with temperature 70-80° C. are actively mixed in a mixer for 5-10 minutes. Then added are Portland cement, gypsum binder for stabilization (increase of stability) of molding cellular concrete mass of molded articles and the remaining quantity of water. Then into the thusly prepared mixture composed of complex silica component and binder, an aqueous suspension of aluminated glass fiber is introduced with constant mixing of the mass during 15 minutes. The temperature of the cellular concrete mixture is 35-45C. The obtained mixture is poured into separable, previously lubricated and heated metal molds. After obtaining a required disassembly strength, the articles are removed from the mold and supplied to a steam chamber for heat-moisture treatment at atmospheric pressure and temperature 90° C. in accordance with the mode 1.5-(6.8)-(1.5-2) hours.

For obtaining gaseous concrete with the proposed composition of gaseous concrete mixture, mixtures with different contents of components have been prepared. The data of the composition of the mixtures and physico-mechanical properties of the samples obtained are presented in tables 1 and 2.

The advantage of the proposed composition of the gaseous concrete mixture is introduction into the molding mass of aluminated glass fibers. The fibers are arranged in interpore partitions of the cellular concrete, form micro reinforcement, and have a very large surface, so as to form barriers on the way of propagation of cracks and communicating pores, and they improve the condition of stability of the molding mass and formation of spherical pores which have similar sizes within the range of 1-2 mm which leads to improvement of working properties of the final article.

The active mixing of the components leads to activation of surface of ingredients and release of surface of glass fiber and subsequent chemical interaction between the components of the mixture.

The test results of the cellular concrete samples showed that the articles have the volume density of 400-750 kg/m$^3$, open porosity 40-65%, strength limit for compression 2.5-7 MPa. The quality parameters of the cellular concrete produced from the proposed raw mixture allows to use it as a heat insulating and heat insulation-structural material.

TABLE 1

| Component | Content of Component % mass of mixture |  |  |  |
|---|---|---|---|---|
|  | 1 | 2 | 3 | 4 |
| Portland cement | 32 | 32 | 32 | 34 |
| Slaked lime | 3.30 | 3.30 | 3.30 | 3.05 |
| Hemihydrate gypsum | 0.45 | 0.45 | 0.45 | 0.50 |
| Ash | 18.50 | 18.5 | 18.5 | 18.56 |
| Asbestos dust |  |  |  | 6.16 |
| Aluminum powder |  |  |  | 0.04 |
| Aluminated glass fiber | 1 | 3 | 5 |  |
| Water | 40.0 | 40.0 | 40.0 | 37.35 |

TABLE 2

| Article from raw mixture samples Mixture No. MPa | Volume density KG/m$^3$ | Strength During compression |
|---|---|---|
| 1 | 440 | 2.9 |
| 2 | 410 | 4.1 |
| 3 | 350 | 7.0 |
| 4 | 725 | 4.0 |

It will be understood that each of the elements described above, or two or more together, may also find a useful application in other types of methods and constructions differing from the type described above.

While the invention has been illustrated and described as embodied in a gas concrete raw mixture, it is not intended to be limited to the details shown, since various modifications and structural changes may be made without departing in any way from the spirit of the present invention.

Without further analysis, the foregoing will so fully reveal the gist of the present invention that others can, be applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A mixture for making gaseous concrete, comprising Portland cement, slaked lime, ash, aluminum gas forming material, dispersed reinforcing glass fiber, water, and wherein as the gas forming material and the dispersed reinforcing fiber it contains aluminated glass fiber, with the following ratio of components in mass %:

| Portland cement | 30-34, |
|---|---|
| Slaked lime | 3-4, |
| Ash | 18-22, |
| Aluminated glass fiber | 1-5, |
| Water | 37-42, |
| Hemihydrate gypsum | 0.4-0.5. |

* * * * *